United States Patent
Inoue

(10) Patent No.: US 12,061,381 B2
(45) Date of Patent: *Aug. 13, 2024

(54) COLORED CONTACT LENS, MANUFACTURING METHOD OF COLORED CONTACT LENS, AND IRIS RECOGNITION SYSTEM

(71) Applicant: NEC Corporation, Tokyo (JP)

(72) Inventor: Mamoru Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,539

(22) Filed: Mar. 1, 2022

(65) Prior Publication Data

US 2022/0187623 A1 Jun. 16, 2022

Related U.S. Application Data

(63) Continuation of application No. 16/646,868, filed as application No. PCT/JP2018/034288 on Sep. 14, 2018, now abandoned.

(30) Foreign Application Priority Data

Nov. 22, 2017 (JP) ................................. 2017-224343

(51) Int. Cl.
*G02C 7/04* (2006.01)
*B29D 11/00* (2006.01)
*G06V 10/80* (2022.01)
*G06V 40/18* (2022.01)
*G06V 40/19* (2022.01)

(52) U.S. Cl.
CPC ........ *G02C 7/046* (2013.01); *B29D 11/00894* (2013.01); *G02C 7/049* (2013.01); *G06V 10/803* (2022.01); *G06V 40/19* (2022.01); *G06V 40/193* (2022.01); *G06V 40/197* (2022.01)

(58) Field of Classification Search
CPC ...... G02C 7/046; G02C 7/049; G06V 40/193; B29D 11/00894
USPC ......................................................... 382/117
See application file for complete search history.

(56) References Cited

U.S. PATENT DOCUMENTS

| 4,738,520 A | * | 4/1988 | Neefe | .............. | B29D 11/00048 |
| | | | | | 351/159.24 |
| 4,867,552 A | * | 9/1989 | Neefe | .................... | G02C 7/046 |
| | | | | | 351/159.24 |
| 4,952,046 A | | 8/1990 | Stephens et al. | | |

(Continued)

FOREIGN PATENT DOCUMENTS

| CA | 2857306 A1 | 6/2013 |
| CA | 2947865 A1 | 11/2015 |

(Continued)

OTHER PUBLICATIONS

International Search Report corresponding to PCT/JP2018/034288, dated Dec. 18, 2018 (5 pages).

(Continued)

*Primary Examiner* — James R Greece

(57) ABSTRACT

Provided is a colored contact lens having: a lens; and a colored region formed in the lens, at least a part of the colored region is arranged at a position overlapping an iris of a wearer when the colored contact lens is worn, and the colored region has infrared transparency.

9 Claims, 13 Drawing Sheets

(56) References Cited

U.S. PATENT DOCUMENTS

| | | | |
|---|---|---|---|
| 5,617,154 A | 4/1997 | Hoffman | |
| 6,164,777 A * | 12/2000 | Li | G02C 7/021 351/159.02 |
| 7,712,901 B2 | 5/2010 | Wernick et al. | |
| 2006/0251316 A1 | 11/2006 | Tucker et al. | |
| 2013/0268071 A1 | 10/2013 | Vilupuru et al. | |
| 2013/0286303 A1 | 10/2013 | Shibuya et al. | |
| 2015/0316688 A1 | 11/2015 | Cefalo et al. | |
| 2015/0347841 A1 * | 12/2015 | Mears | G06V 40/19 348/46 |
| 2016/0171323 A1 * | 6/2016 | Gadde | G06V 40/19 382/117 |
| 2022/0187624 A1 | 6/2022 | Inoue | |

FOREIGN PATENT DOCUMENTS

| | | |
|---|---|---|
| CN | 101084570 A | 12/2007 |
| CN | 103354932 A | 10/2013 |
| CN | 205982876 U | 2/2017 |
| CN | 104793349 B | 9/2017 |
| EP | 1141767 B1 | 3/2006 |
| JP | S58-062601 A | 4/1983 |
| JP | S60-46523 A | 3/1985 |
| JP | S60-235115 A | 11/1985 |
| JP | H06-2335 U | 1/1994 |
| JP | 2001-076072 A | 3/2001 |
| JP | 2001-517324 A | 10/2001 |
| JP | 2002-279402 A | 9/2002 |
| JP | 2005-041023 A | 2/2005 |
| JP | 2005-266538 A | 9/2005 |
| JP | 4561248 B2 | 10/2010 |
| JP | 2013-050557 A | 3/2013 |
| JP | 2015-504691 A | 2/2015 |
| JP | 5816882 B2 | 11/2015 |
| JP | 2016-166109 A | 9/2016 |
| JP | 2017-515822 A | 6/2017 |
| WO | WO-98/44380 | 10/1998 |
| WO | 2013/094073 A1 | 6/2013 |
| WO | WO-2013/082545 A1 | 6/2013 |
| WO | WO-2014/087557 A1 | 8/2014 |
| WO | WO-2014/125742 A1 | 8/2014 |
| WO | WO-2015/171507 A1 | 11/2015 |
| WO | 2016/010720 A1 | 1/2016 |

OTHER PUBLICATIONS

Extended European Search Report issued in European Patent Application No. 18880092.4, dated Dec. 14, 2020, 10 pages.

Kang Ryoung Park, F. J. Perales and R. B. Fisher (Eds.), et al. "Robust Fake Iris Detection", Articulated Motion and Deformable Objects Lecture Notes in Computer Science; LNCS, Springer, Berlin, DE, XP019037053, Jan. 1, 2006 (Jan. 1, 2006), pp. 10-18 (9 pages).

Chinese Office Action for CN Application No. 201880075547.4 mailed on Mar. 5, 2021 with English Translation.

Japanese Office Communication for JP Application No. 2021-170766 mailed on May 9, 2023 with English Translation.

US Office Action and PTO-892 for U.S. Appl. No. 16/646,868 mailed on Apr. 13, 2022.

EP Office Action for EP Application No. 18880092.4, mailed on Mar. 24, 2023.

US Office Action for U.S. Appl. No. 16/646,868 mailed on Oct. 28, 2022.

Japanese Office Action for JP Application No. 2019-556112 mailed on Jun. 21, 2022 with English Translation.

US Office Action for U.S. Appl. No. 17/683,550, mailed on Sep. 29, 2023.

* cited by examiner

COLORED CONTACT LENS, MANUFACTURING METHOD OF COLORED CONTACT LENS, AND IRIS RECOGNITION SYSTEM

CROSS-REFERENCE TO RELATED APPLICATIONS

The present application is a continuation application of U.S. patent application Ser. No. 16/646,868 filed on Mar. 12, 2020, which is a National Stage Entry of international application PCT/JP2018/034288, filed on Sep. 14, 2018, which claims the benefit of priority from Japanese Patent Application 2017-224343 filed on Nov. 22, 2017, the disclosures of all of which are incorporated in their entirety by reference herein.

TECHNICAL FIELD

The present invention relates to a colored contact lens, a manufacturing method of the colored contact lens, and an iris recognition system.

BACKGROUND ART

Patent Literature 1 discloses a colored contact lens having a colored region. When the colored contact lens is worn, an iris of the wearer is covered with a colored region. Thus, the appearance of the iris changes.

CITATION LIST

Patent Literature

PTL 1: International Publication No. 2014/125742

SUMMARY OF INVENTION

Technical Problem

When a colored contact lens as disclosed in Patent Literature 1 is worn, the appearance of the pattern of an iris changes to a pattern different from the actual iris of the wearer. Thus, when iris recognition is performed on a wearer of a colored contact lens, recognition accuracy may be degraded.

The present invention has been made in view of the problem described above and intends to provide a colored contact lens and a manufacturing method of the colored contact lens and an iris recognition system that can reduce influence on accuracy of iris recognition.

Solution to Problem

According to one example aspect of the present invention, provided is a colored contact lens including: a lens; and a colored region formed in the lens, at least a part of the colored region is arranged at a position overlapping an iris of a wearer when the colored contact lens is worn, and the colored region has infrared transparency.

According to another example aspect of the present invention, provided is a manufacturing method of a colored contact lens, the manufacturing method including: forming a lens; and forming a colored region in the lens, at least a part of the colored region is arranged at a position overlapping an iris of a wearer when the colored contact lens is worn, and the colored region has infrared transparency.

According to yet another example aspect of the present invention, provided is an iris recognition system including: an infrared image acquisition unit that captures an iris of a recognition subject wearing a colored contact lens having a colored region by using an infrared ray having a wavelength that transmits the colored region; a visible light image acquisition unit that captures the iris by using a visible light; a determination unit that determines whether or not the recognition subject is wearing the colored contact lens; and a comparison unit that performs comparison on the iris, when the determination unit determines that the recognition subject is wearing the colored contact lens, the recognition unit performs comparison by using an image acquired by an infrared ray, and when the determination unit determines that the recognition subject is not wearing the colored contact lens, the recognition unit performs comparison by using an image acquired by a visible light or an infrared ray.

Advantageous Effects of Invention

According to the present invention, a colored contact lens and a manufacturing method of the colored contact lens and an iris recognition system that can reduce influence on accuracy of iris recognition can be provided.

DESCRIPTION OF EMBODIMENTS

Exemplary example embodiments of the present invention will be described below with reference to the drawings. Throughout the drawings, similar components or corresponding components are labeled with the same references, and the description thereof may be omitted or simplified.

First Example Embodiment

Figure 1:
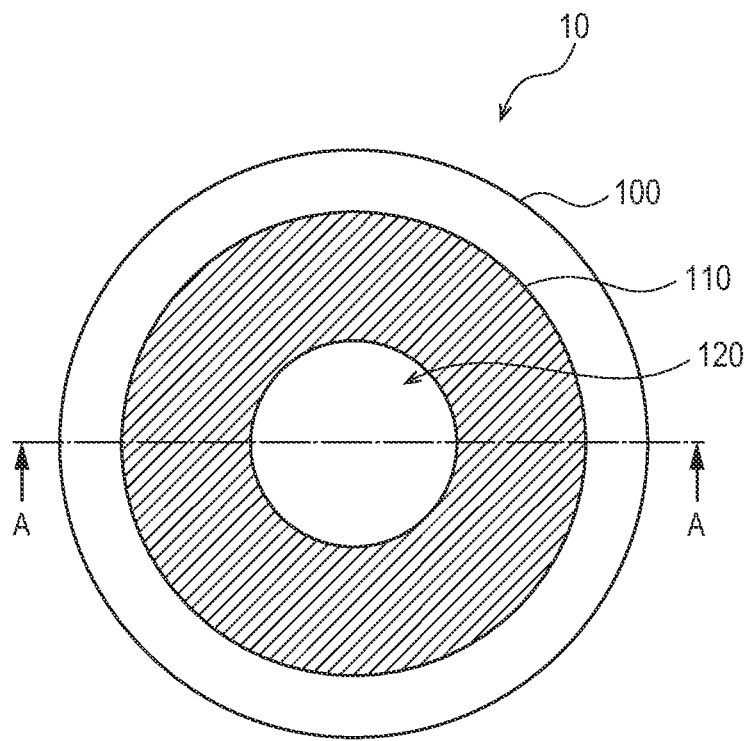
FIG. 1 is a plan view of a colored contact lens according to a first example embodiment.
Figure 2:
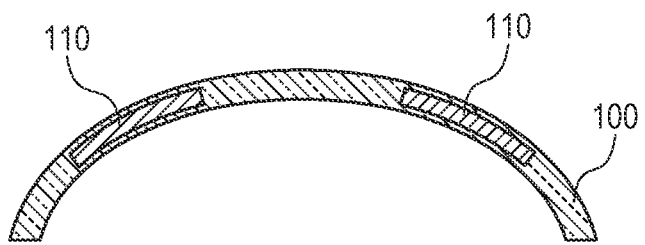
FIG. 2 is a sectional view of the colored contact lens according to the first example embodiment.

FIG. 1 is a plan view of a colored contact lens 10 according to the present example embodiment, and FIG. 2 is a sectional view taken along a line A-A of the colored contact lens 10 according to the present example embodiment. The colored contact lens 10 has a lens 100 and a colored region 110 formed in the lens 100. As illustrated in FIG. 1 and FIG. 2, the lens 100 has a meniscus shape in which one face is a convex and the other face is a concave. The colored region 110 has an annular shape in a planar view. The colored region 110 is arranged at a position where at least a part thereof overlaps an iris of a wearer when the colored contact lens 10 is worn. Thereby, a decoration effect of the iris is obtained. The colored region 110 is often arranged at a position covering the outer circumference of the wearer's iris in order to obtain an effect of causing an iris to look larger.

Further, a transparent portion 120 is arranged at a position corresponding to a pupil inside the colored region 110. This can prevent the colored region 110 from blocking the vision when the colored contact lens 10 is worn. Note that the colored contact lens may be referred to as a color contact lens, a circle contact lens, or a cosmetic contact lens.

Note that, while the colored region 110 has an annular shape for simplified illustration in FIG. 1, the shape is not limited thereto. For example, various shapes such as one whose pattern of the colored region 110 has a radial shape close to a pattern of an actual iris, one whose color of the colored region 110 has gradation with multiple dot patterns, or the like may be employed.

Figure 3:
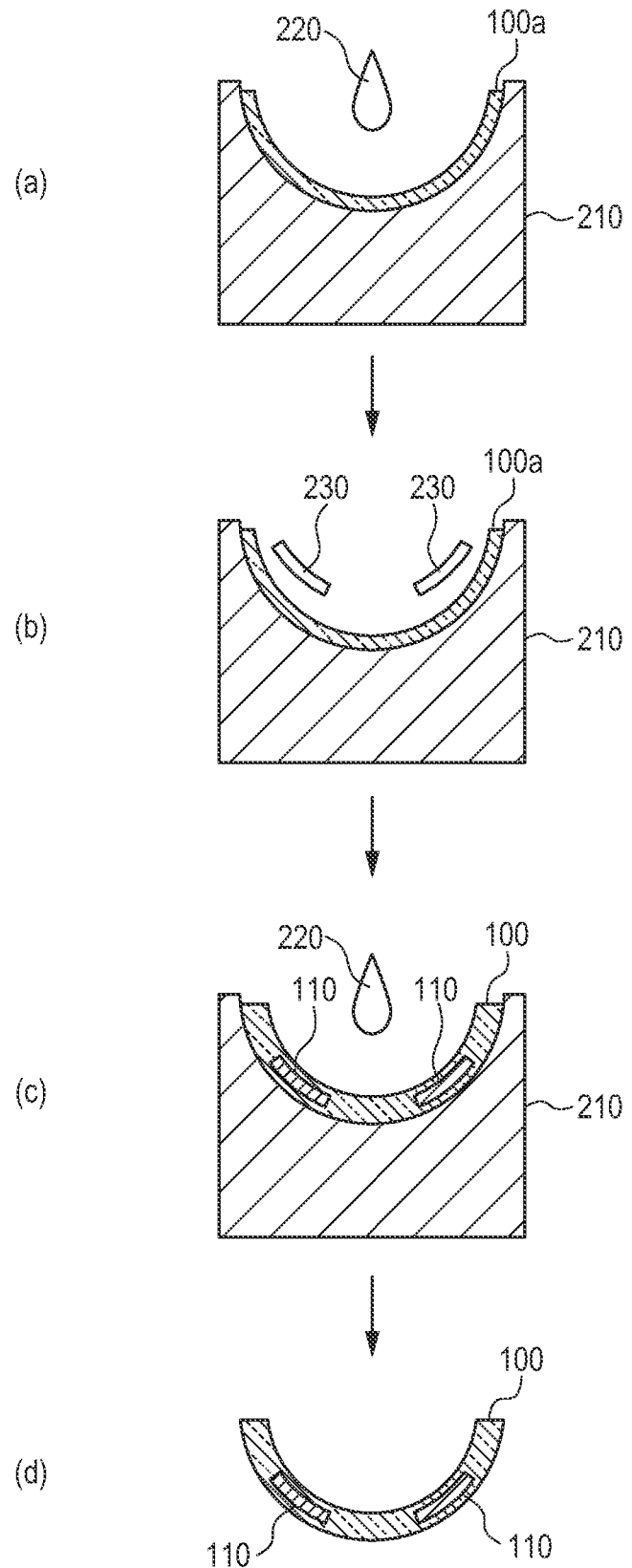
FIG. 3 is a schematic diagram illustrating a manufacturing method of the colored contact lens according to the first example embodiment.

FIG. 3 is a schematic diagram illustrating a manufacturing method of the colored contact lens 10 according to the present example embodiment. Each of step (a) to step (d) in FIG. 3 illustrates a sectional view of the colored contact lens 10 and a mold 210 used for molding it. While FIG. 3 illustrates a so-called sandwich scheme as one example of a manufacturing method of the colored contact lens 10, other schemes may be used. One example of the manufacturing method of the colored contact lens 10 will be described below along the order of steps in FIG. 3.

In step (a), a resin 220 is supplied to the mold 210. The resin 220 is molded as a lens 100a having a meniscus shape along the concave of the mold 210. A spin cast method, a cast mold method, or the like may be used for the molding of the resin 220. The spin cast method is a method to perform molding by utilizing centrifugal force generated by rotating the mold 210. The cast mold method is a scheme to perform molding by fitting a convex mold, which is different from the mold 210, to the concave of the mold 210.

In step (b), a coloring material 230 is formed on the lens 100a. The coloring material 230 forms the colored region 110. Then, in step (c), the resin 220 is again supplied over the lens 100a so as to cover the coloring material 230, and the molding of the resin 220 is performed. This results in a state where the colored region 110 formed of the coloring material 230 is interposed inside the lens 100. After the resin forming the lens 100 is solidified, in step (d), the colored contact lens 10 is released from the mold 210.

The colored contact lens 10 may be a soft contact lens or a hard contact lens. For example, when the colored contact lens 10 is a soft contact lens, the material of the resin 220 may be one commonly used, such as hydroxyethyl methacrylate, silicone hydrogel, or the like.

The nature of the colored region 110 will be described. A material having infrared transparency is used for the coloring material 230. Thereby, the colored region 110 has infrared transparency. Further, a material having absorbability or reflectivity to a visible light is used for the coloring material 230. Thereby, the colored region 110 is opaque to a visible light, and a decoration effect such as an effect to cause an iris to look larger, an effect to change the color of an iris, or the like can be obtained. For example, such the coloring material 230 is commercially available as infrared transparent ink and may be used for a filter or the like of a transceiver unit of an infrared communication device.

Here, a visible light refers to a light whose wavelength is longer than or equal to 400 nm and shorter than or equal to 750 nm. Most persons are able to recognize a light of such a range by their vision. Thus, a material having absorbability or reflectivity to a light having a wavelength of such a range may be suitably used as a coloring material. An infrared ray refers to a light whose wavelength is longer than 750 nm. The colored region 110 has infrared transparency and thus transmits a light whose wavelength is longer than 750 nm. Note that, in the present specification, mere reference to "light" or the like without limitation of wavelength is not limited to mean a visible light but may include an electromagnetic wave of any wavelength, such as a visible light and an infrared ray.

Figure 4:
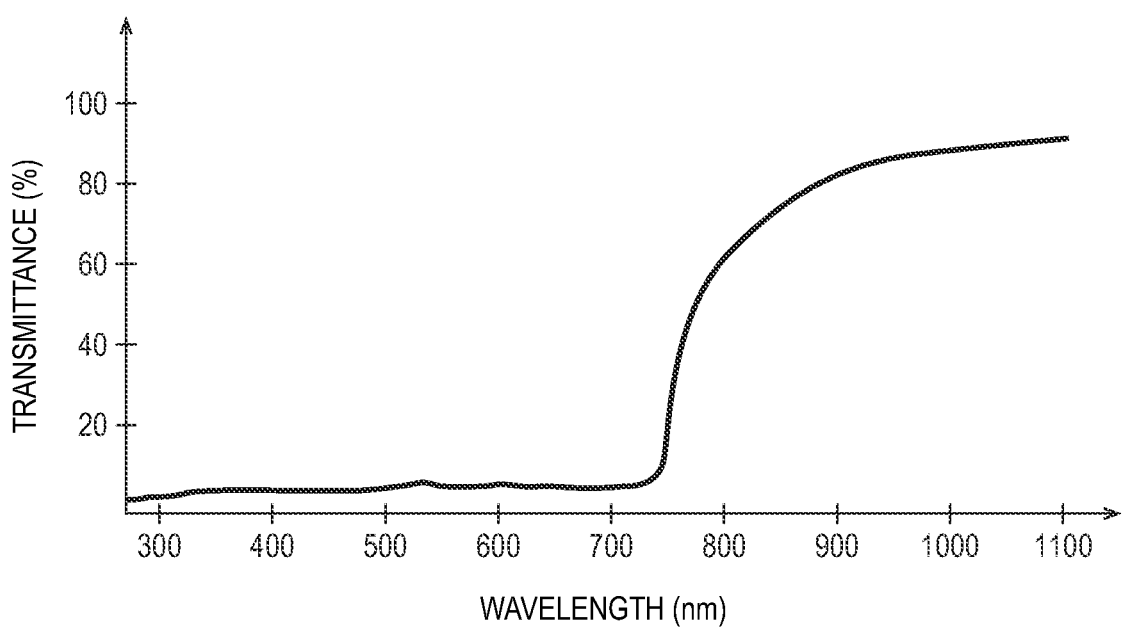
FIG. 4 is a graph illustrating an example of wavelength dependency of the transmittance of a colored region according to the first example embodiment.

FIG. 4 is a graph illustrating an example of wavelength dependency of the transmittance of the colored region 110 according to the present example embodiment. The horizontal axis of FIG. 4 illustrates the wavelength of a light entering the colored region 110, and the vertical axis illustrates the transparency of the light corresponding to the wavelength. As understood from FIG. 4, the transmittance of the colored region 110 is low for the visible light whose wavelength is longer than or equal to 400 nm and shorter than or equal to 750 nm. Thus, the colored region 110 is observed as a region colored in black or the like by a naked eye or a visible light camera. Further, the transmittance of the colored region 110 is high for an infrared ray whose wavelength is longer than 750 nm. Thus, the colored region 110 is observed as a region close to be transparent by the infrared camera.

Figure 5:
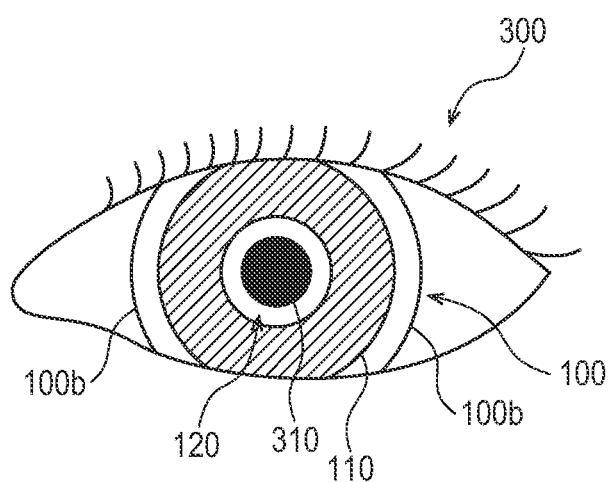
FIG. 5 is a schematic diagram of an image of an eye wearing a colored contact lens captured by a visible light camera.

As discussed above, in the colored contact lens 10 of the present example embodiment, the colored region 110 has frequency dependency on transmittance as described above, and thereby the colored region 110 has different appearance between a visible light and an infrared ray, respectively. FIG. 5 is a schematic diagram of an image of an eye 300 wearing the colored contact lens 10, which has been captured by a visible light camera. As illustrated in FIG. 5, an end 100b of the lens 100, the colored region 110, and the transparent portion 120 can be determined from the image captured by the visible light camera. Further, since the transparent portion 120 is transparent to a visible light, a pupil 310 inside the colored contact lens 10 can be externally determined. Since the iris of the wearer is covered and hidden by the colored region 110, however, the pattern of the iris of the wearer is unable to be determined by the visible light.

Figure 6:
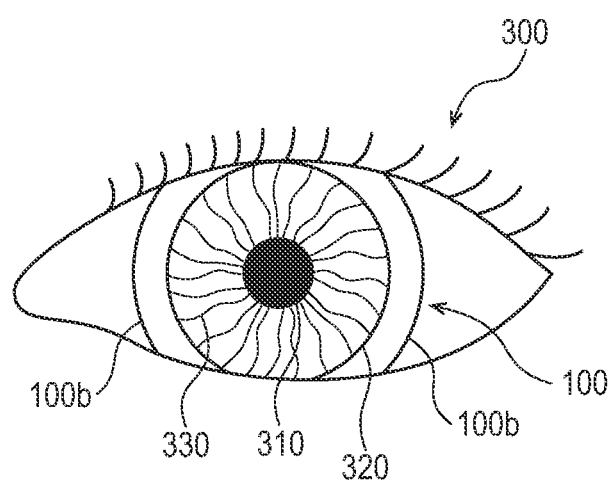
FIG. 6 is a schematic diagram of an image of an eye wearing a colored contact lens captured by an infrared camera.

FIG. 6 is a schematic diagram of an image of the eye 300 wearing the colored contact lens 10, which has been captured by an infrared camera. As illustrated in FIG. 6, since the colored region 110 is transparent in the image captured by the infrared camera, a pattern 330 of an iris 320 of the wearer inside the colored contact lens 10 is able to be determined.

When a colored contact lens is worn, an iris is covered by a colored region. Thus, when iris recognition is performed on a wearer of a colored contact lens, recognition accuracy may be deteriorated. While the pattern near the outer circumference of an iris that is less likely to be affected by contraction of a pupil is one of the important factors in iris authentication, in a colored contact lens, a colored region is often arranged near the outer circumference of an iris in order to obtain an effect to cause the iris to look larger. In such a case, influence of recognition accuracy deterioration is likely to occur.

In contrast, in the colored contact lens 10 of the present example embodiment, at least a part of the colored region 110 has infrared transparency. Thus, even when an iris of a wearer is covered by the colored region 110, it is possible to determine the pattern of the iris of the wearer by capturing the eye by using an infrared camera. Therefore, according to the present example embodiment, the colored contact lens 10 that can reduce influence on accuracy of iris recognition is provided.

In such a way, the colored contact lens 10 of the present example embodiment can perform iris recognition even when worn. Thus, for example, even when iris recognition is employed for identity verification such as identity verification at the time of login to a smartphone, identity verification at the time of entry to or exit from a facility, it is not necessary to put off a contact lens at the time of authentication, which improves convenience.

Note that the expression "having infrared transparency" is not limited to refer to a state where an infrared ray completely transmits. Any state may be included as long as there may be transparency to the degree at which the pattern of an iris of a wearer can be determined by capturing an eye by using an infrared camera. For example, when the transmittance of the colored region 110 to an infrared ray whose wavelength is longer than 750 nm and shorter than 1000 nm is larger than the transmittance of the colored region 110 to a visible light whose wavelength is longer than or equal to 400 nm and shorter than or equal to 750 nm, it can be said that there is infrared transparency. Similarly, the expression "having absorbability or reflectivity" is not limited to refer to a state where no light transmits.

In the present example embodiment, the colored region 110 may be formed of a coloring material 230 having infrared transparency. At this time, the coloring material 230 may be formed to be interposed inside the lens 100. In this manufacturing method, the coloring material 230 is not contained in the surface of the lens but contained inside the lens. Since the coloring material 230 does not come into contact with an eyeball, an eyelid, or the like when the colored contact lens 10 is worn, the colored contact lens 10 of the present example embodiment has the structure that is less likely to affect a living body.

Note that it is not essential that the entire colored region 110 have infrared transparency as long as at least a part of a portion covering an iris of the colored region 110 has infrared transparency. For example, while a pattern extending up to the outside of an iris of a wearer may be provided in the colored contact lens 10, the portion outside an iris of a wearer may not have infrared transparency.

Next, a configuration example of an iris recognition system that performs iris recognition on a subject wearing the colored contact lens 10 according to the present example embodiment will be described.

Figure 7:
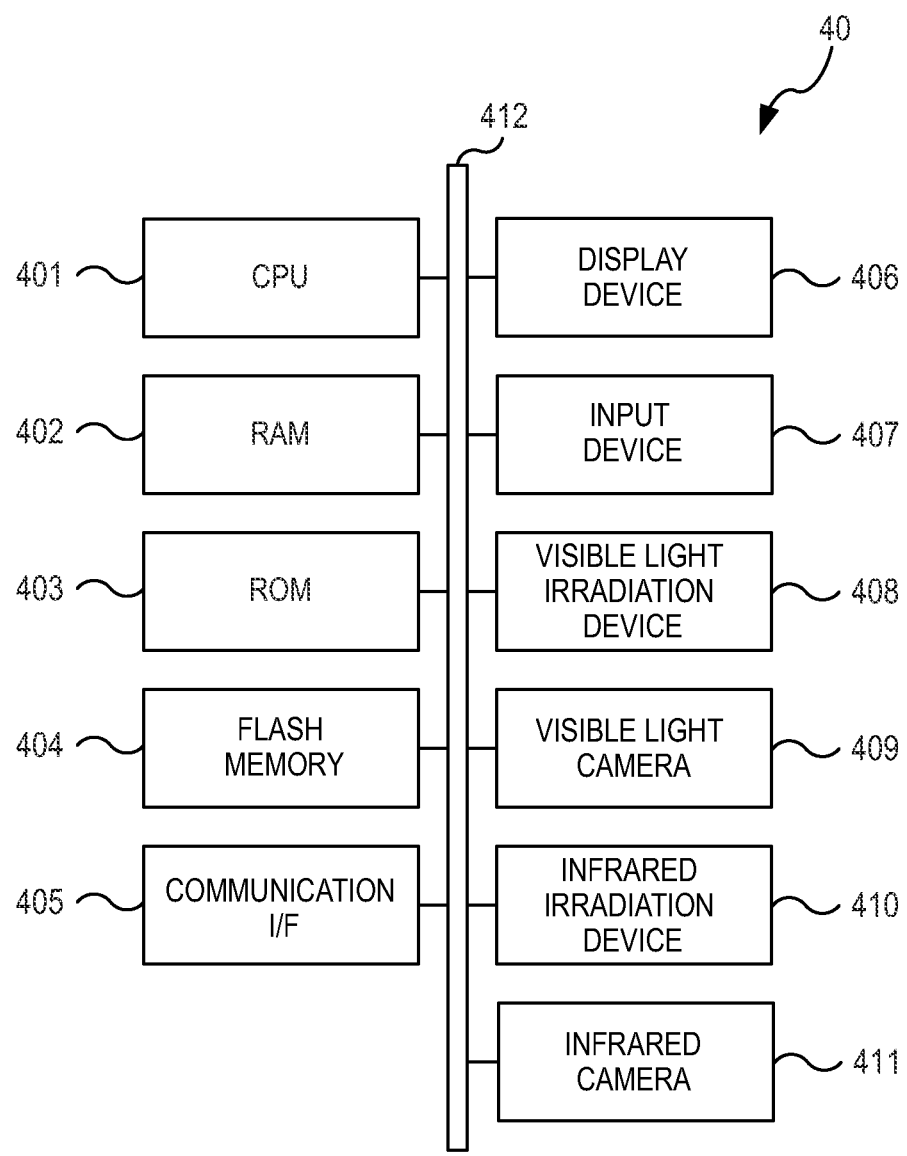
FIG. 7 is a block diagram illustrating a hardware configuration example of an iris recognition system according to the first example embodiment.

FIG. 7 is a block diagram illustrating a hardware configuration example of an iris recognition system 40 that performs iris recognition according to the present example embodiment. The iris recognition system 40 may be a computer or an information communication terminal such as a mobile phone, a smartphone, a tablet personal computer (PC), a laptop PC, a desktop PC, or the like, for example. The iris recognition system 40 has a function of iris recognition that is a type of biometrics recognition. The iris recognition system 40 captures an iris of a user that is a recognition subject and performs iris recognition by comparing the captured iris image with a registered iris image. A pattern of an iris is unique and permanent for a person. It is therefore possible to check whether or not the same person is identified by comparing the pattern of the iris acquired at the time of recognition with the pre-registered iris image. While it is assumed that the iris recognition system 40 is mounted on a smartphone as an example and iris recognition is performed for identity verification at the time of login by the user in the following description, the invention is not limited thereto.

The iris recognition system 40 has a central processing unit (CPU) 401, a random access memory (RAM) 402, a read only memory (ROM) 403, and a flash memory 404 in order to implement functions of a computer that performs calculation and storage. Further, the iris recognition system 40 has a communication interface (I/F) 405, a display device 406, an input device 407, a visible light irradiation device 408, a visible light camera 409, an infrared irradiation device 410, and an infrared camera 411. The CPU 401, the RAM 402, the ROM 403, the flash memory 404, the communication I/F 405, the display device 406, the input device 407, the visible light irradiation device 408, the visible light camera 409, the infrared irradiation device 410, and the infrared camera 411 are connected to each other via a bus 412. Note that the display device 406, the input device 407, the visible light irradiation device 408, the visible light camera 409, the infrared irradiation device 410, and the infrared camera 411 may be connected to the bus 412 via a drive device (not illustrated) used for driving these devices.

While respective components forming the iris recognition system 40 are illustrated in FIG. 7 as an integrated device, some of the functions thereof may be formed by an externally attached device. For example, the visible light irradiation device 408, the visible light camera 409, the infrared irradiation device 410, or the infrared camera 411 may be externally attached devices that are separate from a part forming the function of a computer including the CPU 401 or the like.

The CPU 401 also has a function of performing a predetermined operation in accordance with a program stored in the ROM 403, the flash memory 404, or the like and controlling each component of the iris recognition system 40. The RAM 402 is formed of a volatile storage medium and provides a temporary memory field required for the operation of the CPU 401. The ROM 403 is formed of a nonvolatile storage medium and stores necessary information such as a program used in the operation of the iris recognition system 40. The flash memory 404 is a storage device that is formed of a nonvolatile storage medium and stores an image captured by the infrared camera 411 or the like, an image of a recognition subject, feature amount data, or the like.

The communication I/F 405 is a communication interface based on a specification such as Wi-Fi (registered trademark), 4G, or the like, which is a module for communicating with other devices. The display device 406 is a liquid crystal display, an organic light emitting diode (OLED) display, or the like and is used for displaying a moving image, a static image, a text, or the like. The input device 407 is a button, a touchscreen, or the like and is used by a user to operate the iris recognition system 40. The display device 406 and the input device 407 may be integrally formed as a touchscreen.

The visible light irradiation device 408 and the visible light camera 409 are provided on a display face of the display device 406 or the like, for example. The visible light irradiation device 408 is used as a light source for capturing by the visible light camera 409, for example. The visible light camera 409 can capture a landscape, a face or an eye of a user, or the like with a visible light to acquire an image. A digital camera with a Complementary Metal Oxide Semiconductor (CMOS) image sensor, a Charge Coupled Device (CCD) image sensor, or the like may be used for the visible light camera 409 in terms of suitable image processing after capturing.

The infrared irradiation device 410 is a light emitting element such as an infrared LED that emits an infrared light. A digital camera with a CMOS image sensor, a CCD image sensor, or the like having a light receiving element configured to have a sensitivity to an infrared ray may be used for the infrared camera 411. By irradiating a user's eye with an infrared ray from the infrared irradiation device 410 and capturing an infrared ray reflected at an iris by using the infrared camera 411, it is possible to capture an iris image used for iris recognition. By using an infrared ray to acquire an iris image, it is possible to obtain an image having a high contrast regardless of the color of the iris and reduce influence of reflection at a cornea. Note that the infrared camera 411 can be omitted when the visible light camera 409 can acquire an image with an infrared ray in addition to a visible light. The wavelength of an infrared ray irradiated from the infrared irradiation device 410 may be, for example, in a range longer than 750 nm and shorter than 1000 nm.

Note that the hardware configuration illustrated in FIG. 7 is an example and a device other than the above may be added or some of the devices may not be provided. Further, some of the devices may be replaced with another device having the same function. Furthermore, a part of the function may be provided by another device via a network, or the function forming the present example embodiment may be distributed to a plurality of devices for implementation. For example, the flash memory 404 may be replaced with a Hard Disk Drive (HDD) or may be replaced with cloud storage.

Figure 8:
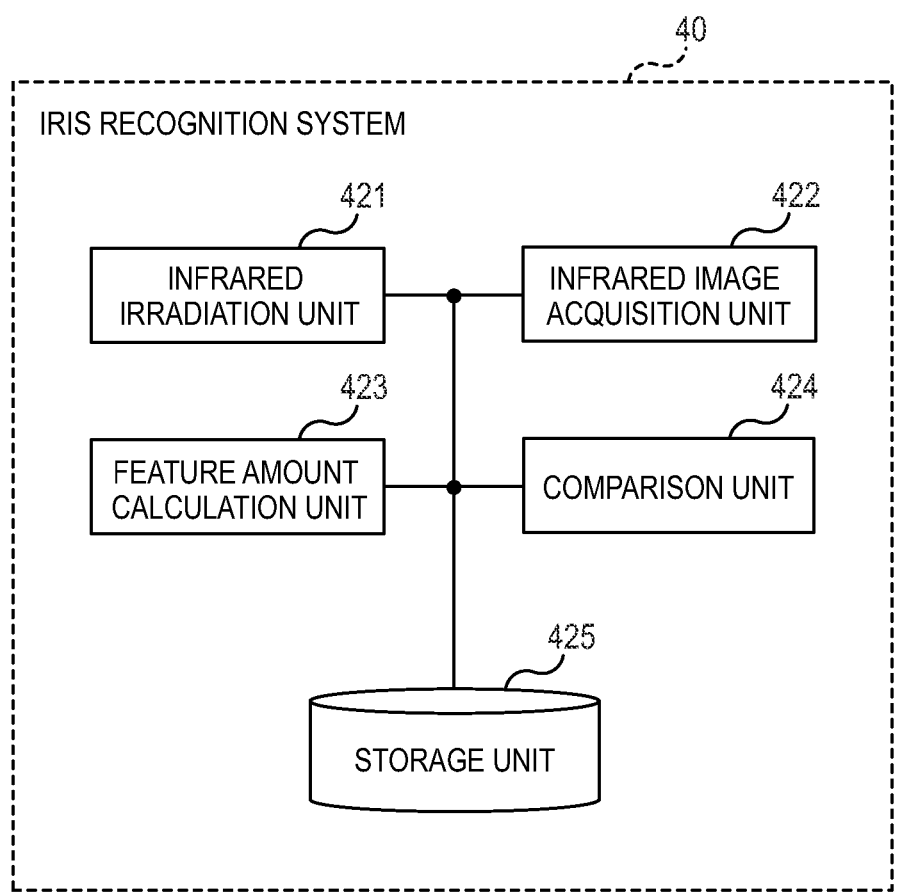
FIG. 8 is a function block diagram of the iris recognition system according to the first example embodiment.

FIG. 8 is a function block diagram of the iris recognition system 40 according to the present example embodiment. The iris recognition system 40 has an infrared irradiation unit 421, an infrared image acquisition unit 422, a feature amount calculation unit 423, a comparison unit 424, and a storage unit 425.

The CPU 401 implements the function of the infrared irradiation unit 421 that irradiates an eye of a recognition subject with an infrared ray by controlling the infrared irradiation device 410. The CPU 401 implements the function of the infrared image acquisition unit 422 that acquires an infrared image of an eye of a recognition subject by controlling the infrared camera 411. The CPU 401 implements the function of the feature amount calculation unit 423 and the comparison unit 424 by loading a program stored in the ROM 403 or the like to the RAM 402 and executing the program. The process performed by each of these units will be described later. The storage unit 425 stores data such as an iris image acquired by the infrared image acquisition unit 422, an iris image registered in advance, and a feature amount calculated from these iris images, or the like. The CPU 401 implements the function of the storage unit 425 by controlling the flash memory 404.

Figure 9:
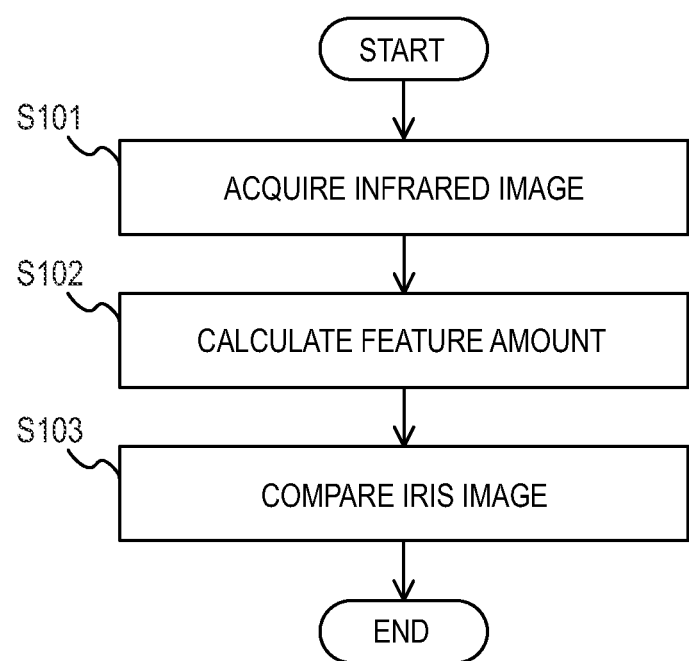
FIG. 9 is a flowchart illustrating an iris recognition process according to the first example embodiment.

FIG. 9 is a flowchart illustrating the outline of an iris recognition process performed by the iris recognition system 40 according to the present example embodiment. In step S101, the infrared irradiation unit 421 irradiates a region including an eye of a recognition subject with an infrared ray. The infrared image acquisition unit 422 acquires an infrared image based on a reflected light of the irradiated infrared ray. The acquired infrared image is stored in the storage unit 425. Typically, such an infrared image is a grayscale image.

In step S102, the feature amount calculation unit 423 calculates a feature amount by using the pattern of the iris included in the infrared image. The calculated feature amount is stored in the storage unit 425.

In step S103, the comparison unit 424 compares the feature amount acquired in step S102 with a feature amount of the iris of the recognition subject registered in advance in the storage unit 425. If it is determined that the comparison corresponds to the iris of the same person, the iris recognition system 40 determines that identity verification is successful and performs a process such as login.

As described above, according to the iris recognition system 40 according to the present example embodiment, it is possible to acquire an infrared image of an iris to perform iris recognition. It is therefore possible to perform iris recognition on a subject wearing the colored contact lens 10 having infrared transparency.

The wavelength of a light used for acquiring an image of an iris will be described. While the wavelength used for acquisition of an image of an iris described above may be appropriately selected as long as it is within a range of an infrared region, it is desirable to set the wavelength taking the accuracy of iris recognition into consideration as described below.

In the iris recognition, the score indicating a matching degree of comparison at a wavelength around 800 nm is likely to be high, which enables accurate recognition. Since an excessively long wavelength reduces the score and reduces the accuracy of iris recognition, it is desirable that the wavelength of a light used for acquiring an image be shorter than 1000 nm. On the other hand, since there is an advantage in a use of an infrared image that iris authentication is enabled with the colored contact lens 10 being worn as described above, it is desirable that that the wavelength of a light used for acquiring an image of an iris be longer than 750 nm. Given these conditions, it is desirable that the wavelength of a light used for acquiring an image of an iris be within a range longer than 750 nm and shorter than 1000 nm. Accordingly, it is desirable that the colored region 110 of the colored contact lens 10 also have transparency to a light whose wavelength is longer than 750 nm and shorter than 1000 nm.

Second Example Embodiment

As a second example embodiment of the present invention, an iris recognition system 50 having a function of determining whether or not the colored contact lens 10 is worn will be described.

Figure 10:
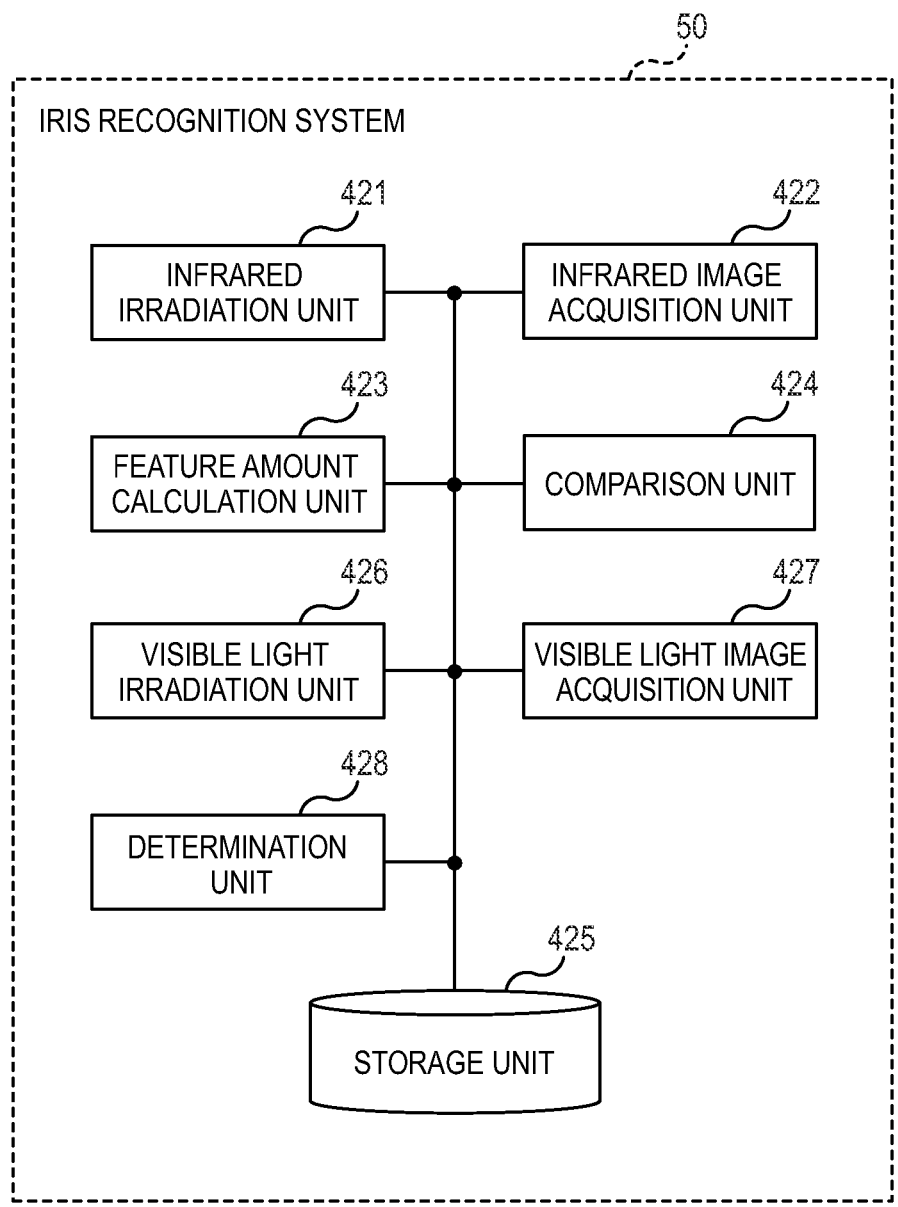
FIG. 10 is a function block diagram of an iris recognition system according to a second example embodiment.

FIG. 10 is a function block diagram of the iris recognition system 50 according to the present example embodiment. The iris recognition system 50 further has a visible light irradiation unit 426, a visible light image acquisition unit 427, and a determination unit 428 in addition to the configuration of the iris recognition system 40 of the first example embodiment.

The CPU 401 implements the function of the visible light irradiation unit 426 that irradiates an eye of a recognition subject with a visible light by controlling the visible light irradiation device 408. The CPU 401 implements the function of the visible light image acquisition unit 427 that acquires a visible light image of an eye of a recognition subject by controlling the visible light camera 409. The CPU 401 implements the function of the determination unit 428 by loading a program stored in the ROM 403 or the like to the RAM 402 and executing the program. The function of the determination unit 428 will be described later.

Figure 11:
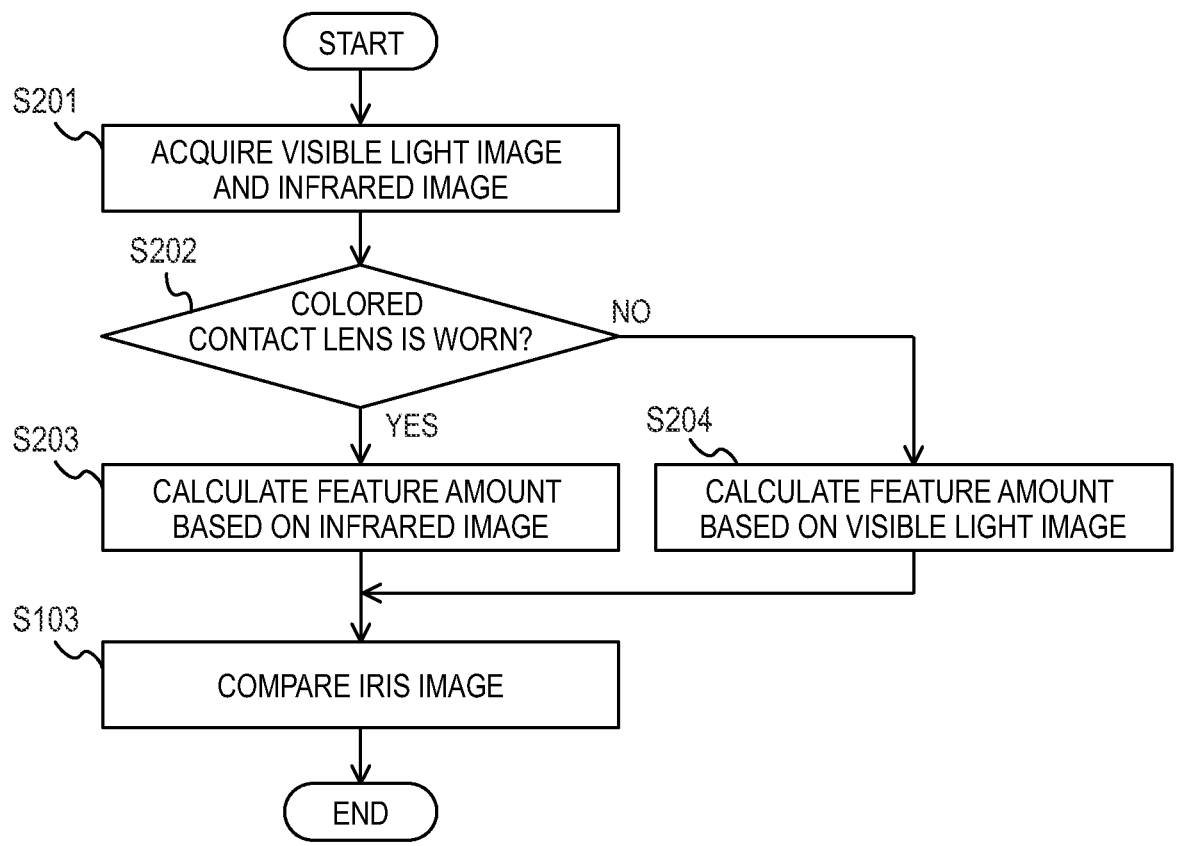
FIG. 11 is a flowchart illustrating an iris recognition process according to the second example embodiment.

FIG. 11 is a flowchart illustrating the outline of an iris recognition process performed by the iris recognition system 50 according to the present example embodiment.

In step S201, a visible light image and an infrared image are acquired. These images are used in determination in subsequent step S202 as to whether or not the colored contact lens 10 is worn. The infrared image of the eye of the recognition subject is acquired by the same process as step S101 of FIG. 9. Further, a visible light image of the eye of the recognition subject is acquired by the visible light irradiation unit 426 and the visible light image acquisition unit 427. The visible light irradiation unit 426 irradiates a region including the eye of the recognition subject with a visible light. The visible light image acquisition unit 427 acquires a visible light image based on a reflected light of the irradiated visible light. The acquired visible light image is stored in the storage unit 425.

In step S202, the determination unit 428 uses the visible light image and the infrared image acquired in step S201 to determine whether or not the recognition subject is wearing the colored contact lens 10. This determination may be performed by comparing the visible light image and the infrared image and based on whether or not the difference for a portion corresponding to an iris exceeds a threshold, for example. As seen from FIG. 5 and FIG. 6, this is because the pattern of a portion corresponding to the colored region 110 is different between a visible light image and an infrared image. Alternatively, a determiner which has performed learning in advance through machine learning may be used as the determination unit 428. A visible light image and an infrared image obtained when the colored contact lens 10 is worn and a visible light image and an infrared image obtained when the colored contact lens 10 is not worn may be used for teaching data for learning.

If it is determined that the recognition subject is wearing the colored contact lens 10 in step S202 (step S202, YES), the process proceeds to step S203. If it is determined that the recognition subject is not wearing the colored contact lens 10 in step S202 (step S202, NO), the process proceeds to step S204.

In step S203, the feature amount calculation unit 423 calculates a feature amount by using the pattern of the iris included in the infrared image. The calculated feature amount is stored in the storage unit 425.

In step S204, the feature amount calculation unit 423 calculates a feature amount by using the pattern of the iris included in the visible light image. The calculated feature amount is stored in the storage unit 425. Since the subsequent process is the same as that of the iris recognition system 40 of the first example embodiment, the description thereof will be omitted.

Note that it is not essential to calculate a feature amount by using a visible light image in the process of step S204, and a feature amount may be calculated by using an infrared image also in step S204. That is, in the process of step S204, a feature amount may be calculated by using any of an infrared image or a visible light image. For example, the image used for calculation of a feature amount may be changed in accordance with a situation, such as an image in which the pattern of an iris is clearly displayed may be selected for use in the feature amount calculation process.

As described above, the iris recognition system 50 of the present example embodiment can determine whether or not the colored contact lens 10 having a colored region with infrared transparency is worn. When the colored contact lens 10 is worn, the iris recognition system 50 can perform iris recognition by using an infrared image and reduce influence of the colored contact lens 10 on recognition accuracy. Further, when the colored contact lens 10 is not worn, the iris recognition system 50 can use a visible light image for iris recognition, for example. This is because, in such a case, no restriction is necessary as to which image to use for iris recognition. Therefore, flexibility of processing is improved.

The colored contact lens described in the above example embodiments may also be configured as a third example embodiment below.

Third Example Embodiment

Figure 12:
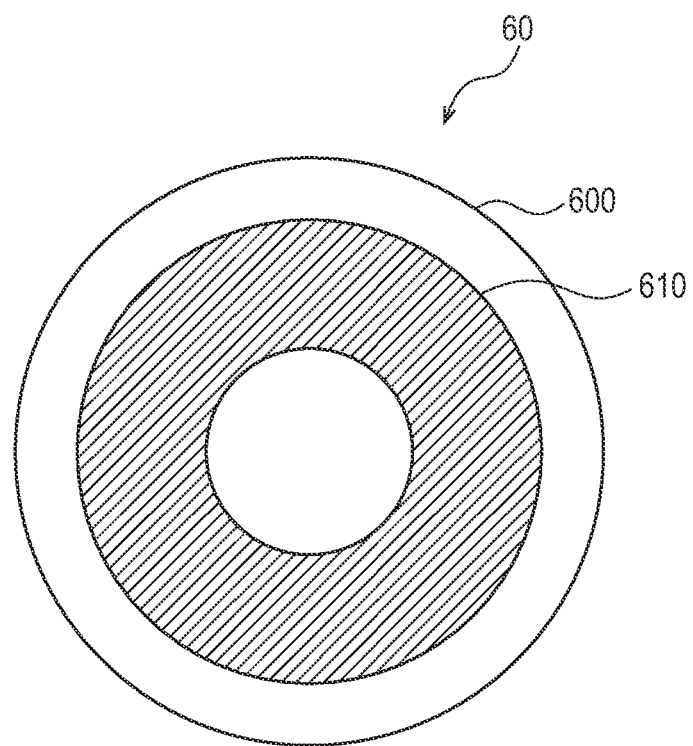
FIG. 12 is a plan view of a contact lens according to a third example embodiment.

FIG. 12 is a plan view of a colored contact lens 60 according to the present example embodiment. The colored contact lens 60 has a lens 600 and a colored region 610 formed in the lens 600. Here, at least a part of the colored region 610 is arranged at a position overlapping an iris of a wearer when the colored contact lens 60 is worn. Further, the colored region 610 has infrared transparency.

According to the present example embodiment, a colored contact lens that can reduce influence on accuracy of iris recognition can be provided.

A manufacturing method of the colored contact lens described in the above example embodiments may also be configured as a fourth example embodiment below.

Fourth Example Embodiment

Figure 13:
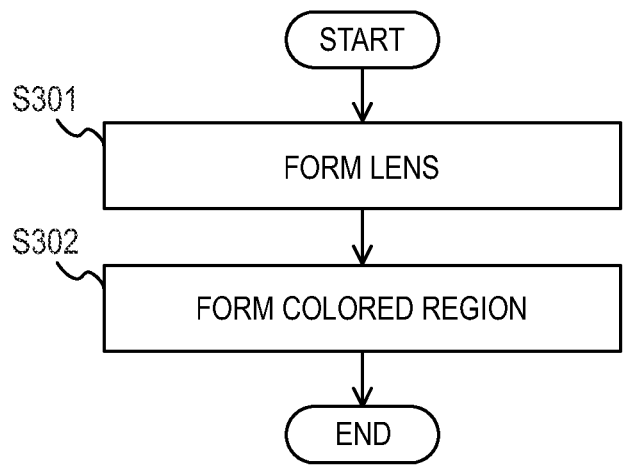
FIG. 13 is a flowchart illustrating a manufacturing method of a contact lens according to a fourth example embodiment.

FIG. 13 is a flowchart illustrating a manufacturing method of a colored contact lens according to the fourth example embodiment. In step S301, a lens is formed. In step S302, a colored region is formed in the lens. Here, at least a part of the colored region is arranged at a position overlapping an iris of a wearer when the colored contact lens is worn. Further, the colored region has infrared transparency.

According to the present example embodiment, a manufacturing method of a colored contact lens that can reduce influence on accuracy of iris recognition can be provided.

Modified Example Embodiment

The present invention is not limited to the example embodiments described above and can be appropriately changed within a scope not departing from the spirit of the present invention.

The iris recognition systems 40 and 50 of the example embodiments described above may be used not only for authentication at the time of login illustrated as an example but also for various identity verification. For example, the iris recognition systems of the example embodiments described above may be applied to identity verification for entry into or departure from a country at an airport, a seaport, or a national border, identity verification at an administrative organization, identity verification for entry to or exit from a factory or an office, identity verification at the time of entry to an event site, or the like.

In each of the example embodiments described above, acquisition of an image used for iris recognition may be performed on one of the eyes of an authentication subject or may be performed on both of the eyes. There are advantages of improvement of processing speed or reduction of storage capacity when an image of only one of the eyes is acquired, and there is an advantage of improvement of authentication accuracy when images of both of the eyes are acquired.

The scope of each example embodiment also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of each example embodiment described above can be provided to the user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)
A colored contact lens comprising:
a lens; and
a colored region formed in the lens,
wherein at least a part of the colored region is arranged at a position overlapping an iris of a wearer when the colored contact lens is worn, and
wherein the colored region has infrared transparency.

(Supplementary Note 2)
The colored contact lens according to supplementary note 1, wherein at least a part of a pattern of the iris is unable to be determined by a visible light but is able to be determined by an infrared ray when the colored contact lens is worn.

(Supplementary Note 3)
The colored contact lens according to supplementary note 1 or 2, wherein the colored region has transparency to a light whose wavelength is longer than 750 nm.

(Supplementary Note 4)
The colored contact lens according to any one of supplementary notes 1 to 3, wherein the colored region has transparency to a light whose wavelength is longer than 750 nm and shorter than 1000 nm.

(Supplementary Note 5)
The colored contact lens according to any one of supplementary notes 1 to 4, wherein the colored region has absorbability or reflectivity to a light whose wavelength is longer than or equal to 400 nm and shorter than or equal to 750 nm.

(Supplementary Note 6)
The colored contact lens according to any one of supplementary notes 1 to 5, wherein a transmittance of the colored region to a light whose wavelength is longer than 750 nm and shorter than 1000 nm is larger than a transmittance of the colored region to a light whose wavelength is longer than or equal to 400 nm and shorter than or equal to 750 nm.

(Supplementary Note 7)
The colored contact lens according to any one of supplementary notes 1 to 6, wherein the colored region is arranged at a position that covers an outer circumference of the iris when the colored contact lens is worn.

(Supplementary Note 8)
The colored contact lens according to supplementary note 7, wherein the colored region is arranged at a position that does not cover a pupil of the wearer when the colored contact lens is worn.

(Supplementary Note 9)
The colored contact lens according to any one of supplementary notes 1 to 8,
wherein the colored region is formed of a coloring material having infrared transparency, and
wherein the coloring material is not contained in a surface of the lens but contained inside the lens.

(Supplementary Note 10)
An iris recognition system comprising an infrared image acquisition unit that captures an iris of a recognition subject wearing the colored contact lens according to any one of supplementary notes 1 to 9 by using infrared ray of a wavelength that transmits the colored region.

(Supplementary Note 11)
An iris recognition system comprising:
an infrared image acquisition unit that captures an iris of a recognition subject wearing a colored contact lens having a colored region by using an infrared ray having a wavelength that transmits the colored region;
a visible light image acquisition unit that captures the iris by using a visible light;
a determination unit that determines whether or not the recognition subject is wearing the colored contact lens; and
a comparison unit that performs comparison on the iris,
wherein when the determination unit determines that the recognition subject is wearing the colored contact lens, the recognition unit performs comparison by using an image acquired by an infrared ray, and
wherein when the determination unit determines that the recognition subject is not wearing the colored contact lens, the recognition unit performs comparison by using an image acquired by a visible light or an infrared ray.

(Supplementary Note 12)
A manufacturing method of a colored contact lens, the manufacturing method comprising:
forming a lens; and
forming a colored region in the lens,
wherein at least a part of the colored region is arranged at a position overlapping an iris of a wearer when the colored contact lens is worn, and
wherein the colored region has infrared transparency.

(Supplementary Note 13)
The manufacturing method of the colored contact lens according to supplementary note 12, wherein the colored region is formed of a coloring material having infrared transparency, and wherein the coloring material is not contained in a surface of the lens but contained inside the lens.

This application is based upon and claims the benefit of priority from Japanese Patent Application No. 2017-224343, filed on Nov. 22, 2017, the disclosure of which is incorporated herein in its entirety by reference.

REFERENCE SIGNS LIST 10 colored contact lens
100 lens
110 colored region
120 transparent portion

The invention claimed is:

1. A contact lens comprising:
a lens;
a first region formed in the lens, and
a second region formed in the lens,
wherein the first region has an annular shape in a planer view,
wherein the second region is arranged inside of the first region in the planer view,
wherein at least a part of the first region is arranged at a position overlapping an iris of a wearer and is not arranged at a position overlapping a pupil of the wearer when the contact lens is worn,
wherein the first region has transparency to a light having a first wavelength and has absorbability or reflectivity to a light having a second wavelength,
wherein at least a part of the second region is arranged at a position overlapping the pupil of the wearer when the contact lens is worn, and
wherein the second region has transparency to the light having the second wavelength.

2. The contact lens according to claim 1, wherein at least a part of a pattern of the iris is unable to be determined by the light having the second wavelength but is able to be determined by the light having the first wavelength when the contact lens is worn.

3. The contact lens according to claim 1, wherein the first wavelength is longer than 750 nm.

4. The contact lens according to claim 1, wherein the first wavelength is longer than 750 nm and shorter than 1000 nm.

5. The contact lens according to claim 1, wherein the second wavelength is longer than or equal to 400 nm and shorter than or equal to 750 nm.

6. The contact lens according to claim 1, wherein a transmittance of the first region to a light whose wavelength is longer than 750 nm and shorter than 1000 nm is larger than a transmittance of the first region to a light whose wavelength is longer than or equal to 400 nm and shorter than or equal to 750 nm.

7. The contact lens according to claim 1, wherein the first region is arranged at a position that covers an outer circumference of the iris when the contact lens is worn.

8. The contact lens according to claim 1,
wherein the first region is formed of a coloring material having infrared transparency, and
wherein the coloring material is not contained in a surface of the lens but contained inside the lens.

9. An iris recognition system comprising a first image acquisition unit that captures an iris of a recognition subject wearing the contact lens according to claim 1 by using the light having the first wavelength.

* * * * *